(12) United States Patent
Iino

(10) Patent No.: US 6,811,108 B2
(45) Date of Patent: Nov. 2, 2004

(54) RECORDING TAPE CARTRIDGE

(75) Inventor: Wataru Iino, Kanagawa (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 27 days.

(21) Appl. No.: 10/293,268

(22) Filed: Nov. 14, 2002

(65) Prior Publication Data
US 2003/0094529 A1 May 22, 2003

(30) Foreign Application Priority Data
Nov. 20, 2001 (JP) ........................ 2001-354880

(51) Int. Cl.⁷ .............................................. G03B 23/02
(52) U.S. Cl. .................... 242/348; 242/338.4; 242/337; 414/741; 414/744.6
(58) Field of Search ............................. 242/337, 337.1, 242/338, 338.4, 348, 348.2, 347; 414/280, 741, 744.6, 226.05; 294/15; 360/132

(56) References Cited

U.S. PATENT DOCUMENTS 6,299,088 B1 * 10/2001 Rambosek .................. 242/347

2003/0156356 A1 * 8/2003 Argumedo et al. ......... 360/132

FOREIGN PATENT DOCUMENTS

EP  0 677 845 A2  10/1995

* cited by examiner

Primary Examiner—John M. Jillions
(74) Attorney, Agent, or Firm—Sughrue Mion, PLLC

(57) ABSTRACT

A recording tape cartridge which can be loaded in a drive device by a robot hand which grips the recording tape cartridge from above and below. A pair of ribs along a loading direction of a recording tape cartridge are formed at an angled surface portion of a lower case. A separation distance between these ribs is substantially the same as a width of a lower hand portion of a robot hand. The robot hand grips the recording tape cartridge such that the lower hand portion of the robot hand is disposed between the two ribs. When the recording tape cartridge is being loaded into the drive device, the ribs abut against lateral direction end surfaces of the lower hand portion. Thus, positioning of the recording tape cartridge in the lateral direction relative to the lower hand portion is achieved through the ribs.

21 Claims, 11 Drawing Sheets

RECORDING TAPE CARTRIDGE

BACKGROUND OF THE INVENTION

1. Field of the Invention

The present invention relates to a recording tape cartridge for positioning a case accommodating a reel, upon which a recording tape such as a magnetic tape or the like is wound, in a drive device.

2. Description of the Related Art

Recording tapes such as magnetic tapes and the like are used as recording media for saving data (information) of computers and the like, for audio uses, for video uses, and the like. In order to prevent damage to a recording surface of such a recording tape, due to adherence of dust or the like to the recording surface, finger contact and the like, the recording tape is employed in a recording tape cartridge. In this recording cartridge, the recording tape is wound onto a reel and the reel is rotatably accommodated in a case formed of resin.

"Single reel cartridges", in which a recording tape wound onto a single reel is accommodated in a case (these are principally used for back-up of information for computers and the like), two-reel cartridges, which are provided with two reels for winding and unwinding (for example, audio cassettes, video cassettes and the like), and the like are known as recording tape cartridges. Whenever information is to be recorded or replayed with one of these recording tape cartridges, the recording tape cartridge is loaded at a drive device (a recording/replaying device).

These recording tape cartridges are usually stored in large numbers in a store known as a library, which is equipped with a plurality of holders in which the recording tape cartridges can be stored. A desired one of these recording tape cartridges is taken out by a robot hand or the like, and loaded into one of a plurality of drive devices. Combinations of a recording tape cartridge that has been taken out by the robot hand and a drive device into which that recording tape cartridge is to be loaded are somewhat random, with the recording tape cartridge being loaded into an appropriate drive device that is vacant.

In a state in which the recording tape cartridge has been loaded into the drive device and the case has been positioned in the drive device, the recording tape is drawn out of the case. This recording tape is guided along a predetermined tape path, and is set at a position close to a recording/replaying head of the drive device. In this state, information is recorded onto the recording tape and/or information that has been recorded on the recording tape is replayed.

As shown in FIGS. 10 and 11, a robot hand 200 is moveable along rails 202 and 204 in the direction of an arrow C and the direction of an arrow D. The robot hand 200 moves according to the position of a holder 208 at which a desired recording tape cartridge 206 is stored or according to the position of a drive device 210.

The robot hand 200 is equipped with a gripping body 212, which grips the recording tape cartridge 206. Hand portions 214 are disposed at left and right of the gripping body 212. The recording tape cartridge 206 is gripped from left and right in a lateral direction by these hand portions 214, and the recording tape cartridge 206 is moved from the holder 208 to the drive device 210, or the recording tape cartridge 206 is moved from the drive device 210 to the holder 208.

In order that insertion and removal of the recording tape cartridge 206 can be performed smoothly, a slight gap (free play) is provided between the recording tape cartridge 206 and the holder 208 and between the recording tape cartridge 206 and the drive device 210. The recording tape cartridge 206 is positioned in the lateral direction with respect to the robot hand 200 due to the hand portions 214 gripping the recording tape cartridge 206 from left and right in the lateral direction. Thus, the recording tape cartridge 206 is positioned with respect to the lateral direction of the holder 208 or the drive device 210, via the robot hand 200.

However, although the robot hand is not illustrated thus, there are also types of robot hands in which hand portions are disposed at top and bottom, with the robot hand gripping the recording tape cartridge 206 from above and below and moving the recording tape cartridge 206.

In this case, in the state in which the recording tape cartridge 206 is gripped, there is no means for positioning the recording tape cartridge 206 in the lateral direction. Therefore, the recording tape cartridge 206 might be loaded into the holder 208 or the drive device 210 in a state in which the recording tape cartridge 206 is displaced in the lateral direction due to the gap that is provided between the recording tape cartridge 206 and the holder 208 or between the recording tape cartridge 206 and the drive device 210. In such a case, there is a risk that the recording tape cartridge 206 may be knocked against the holder 208 or drive device 210 when the recording tape cartridge 206 is loaded into the holder 208 or drive device 210.

SUMMARY OF THE INVENTION

The present invention is provided in consideration of the above-described circumstances, and an object of the present invention is to provide a recording tape cartridge which is positionable in a lateral direction of the recording tape cartridge, even with a robot hand of a type which grips the recording tape cartridge from above and below.

One aspect of the present invention is provided by a recording tape cartridge which can be gripped from predetermined directions using a gripping tool and loaded at a drive device for at least one of recording and replaying information, the recording tape cartridge comprising: recording tape; and a case in which the recording tape is accommodated, the case comprising outer surfaces at an upper side and a lower side, which upper and lower outer surfaces are grippable by a gripping tool, and the case further comprising a wall surface at a loading direction rear end vicinity thereof, wherein the wall surface abuts against a side end surface of the gripping tool during loading and the case is positioned in a lateral direction which substantially intersects the loading direction.

The side end surface of the gripping tool is oriented to the lateral direction, that is, the side end surface of the gripping tool has a surface substantially facing in the lateral direction. The wall surface follows and is guided along a side end surface of the gripping member and is positioned in the lateral direction during a gripping operation of the gripping tool, the wall surface includes two opposing surfaces, and the gripping tool grips the case so as to be positioned between the two opposing surfaces. The gripping tool is attached to a robot arm and constitutes a gripping portion of the robot arm. The case may further include a rib protruding from a surface of the case at an outer surface rear end vicinity, which rib provides the wall surface.

Accordingly, walls are provided as a means for positioning the recording tape cartridge. The walls are abutted against lateral end portions (the side end portions) of the gripping portions of the robot hand, and position the case.

Therefore, even in a state in which, due to a gap provided between a holder and the recording tape cartridge or between the recording tape cartridge and the drive device, the recording tape cartridge is displaced in the lateral direction in the holder or drive device, the recording tape cartridge can be positioned in the lateral direction via the robot hand. Thus, the recording tape cartridge can be positioned with respect to the lateral directions of the holder and the drive device.

Specifically, at the lower surface side of the case, a recessed portion is formed at a rear end side, in the loading direction, of the case. The recessed portion has substantially the same width as a width dimension of a gripping portion of the robot hand. Consequently, in the state in which the upper and lower surfaces of the case are gripped, side walls of the recessed portion abut against the lateral end portions of the gripping portion. Therefore, positioning of the recording tape cartridge relative to the gripping portion in the lateral direction is achieved through the recessed portion.

Further, ribs that have substantially the same separation distance as a width dimension of the gripping portion of the robot hand may be formed at the lower surface side of the case, at the rear end side of the case in the loading direction. Because of these ribs, in the state in which the upper and lower surfaces of the case are gripped, the lateral end portions of the gripping portion abut against the pair of ribs. Therefore, positioning of the recording tape cartridge relative to the gripping portion in the lateral direction is achieved through the ribs.

A width dimension at a rim of the recessed portion may be made wider than at a bottom portion (base portion) of the recessed portion, or a separation distance between distal end portions of the ribs may be made wider than at a base portion side. Consequently, when the gripping portion grips the recording tape cartridge, the gripping portion can easily guide the recessed portion or the ribs.

DESCRIPTION OF THE PREFERRED EMBODIMENTS

A magnetic tape cartridge relating to an embodiment of the present invention will be briefly explained. For convenience of explanation, front, back, left, right, up and down will be expressed with reference to a case of viewing in the direction of an arrow A, with a direction of loading the magnetic tape cartridge into a drive device (the direction of arrow A) being referred to as forward, and the direction of an arrow B being referred to as downward.

Figure 1:
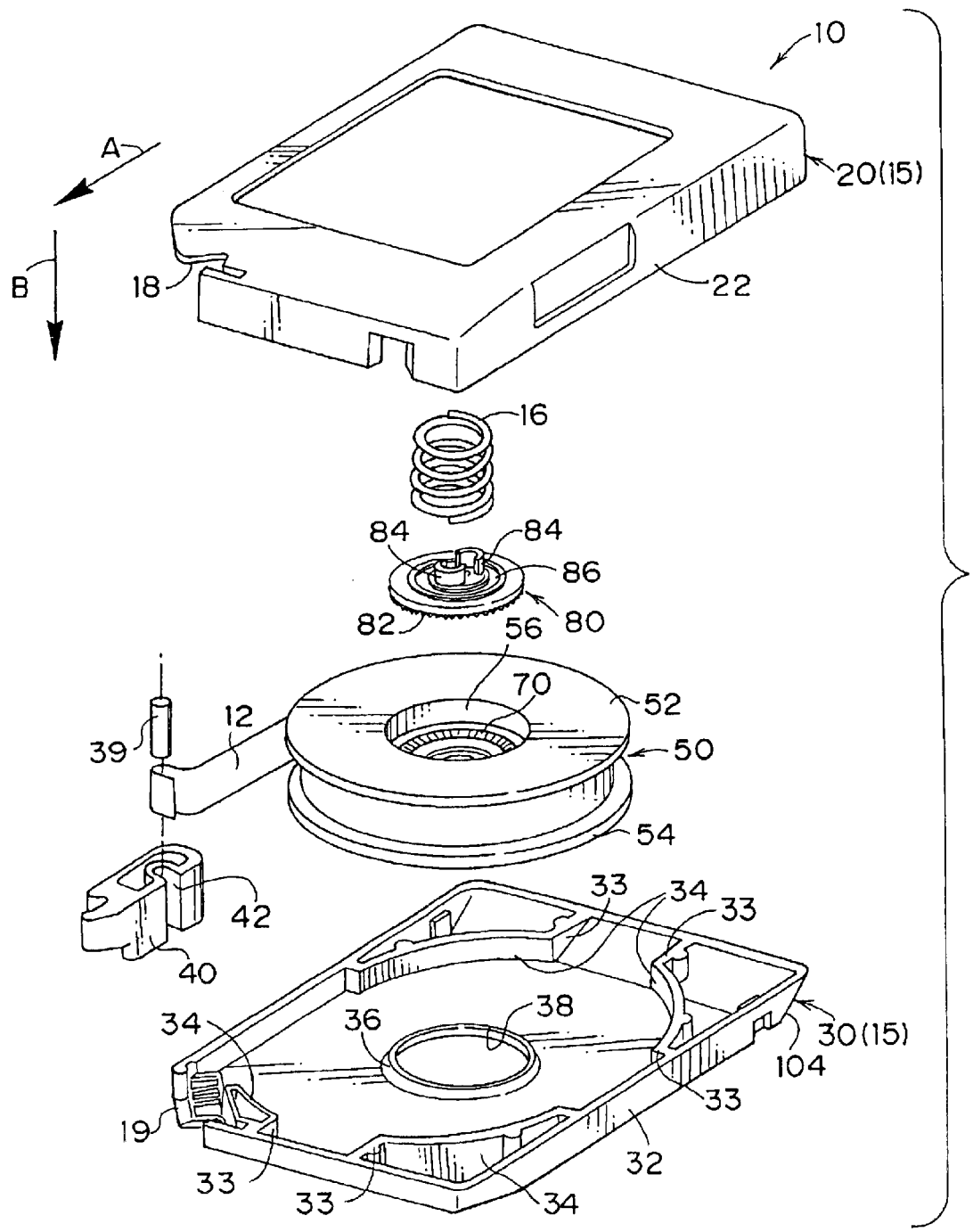
FIG. 1 is an exploded perspective view showing overall structure of a magnetic tape cartridge relating to an embodiment of the present invention.
Figure 2:
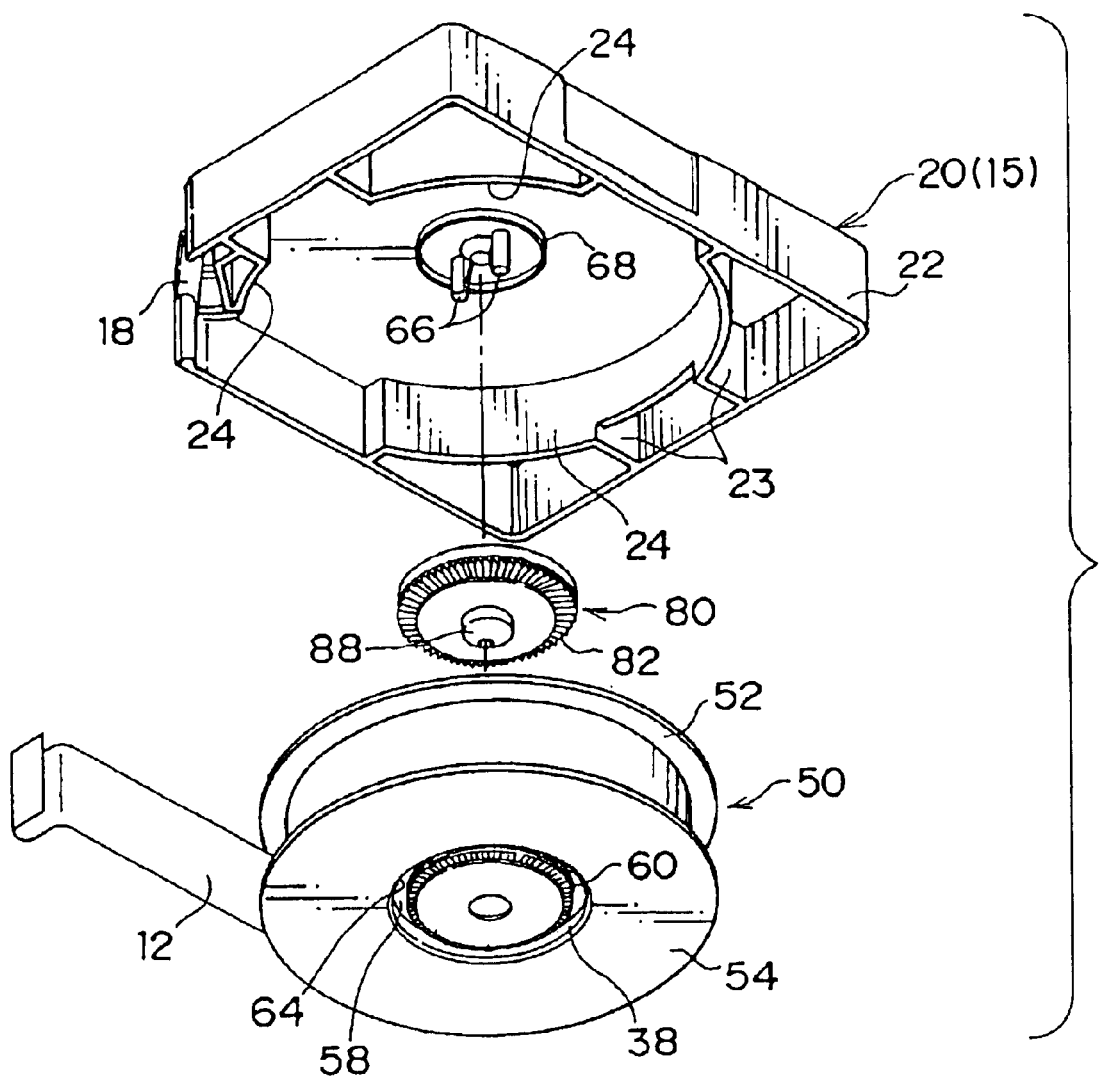
FIG. 2 is a perspective view as seen from below an upper case and a reel which structure the magnetic tape cartridge relating to the embodiment of the present invention.

As shown in FIGS. 1 and 2, a magnetic tape cartridge 10 is provided with a case 15 which is formed in a substantially rectangular box shape. This case 15 is constituted by an upper case 20 and a lower case 30, which are made of synthetic resin. A peripheral wall 22 of the upper case 20 and a peripheral wall 32 of the lower case 30 are welded by ultrasonic welding or the like to form the case 15.

Annular walls 24 and 34 (specifically, segments which constitute portions of annular walls) are respectively provided standing at interior portions of the upper case 20 and the lower case 30. Internal diameters of the annular walls 24 and 34 are slightly larger than external diameters of an upper flange 52 and a lower flange 54 of a reel 50. The reel 50 is rotatably accommodated in the annular walls 24 and 34.

A plurality of ribs 23 are provided between the annular wall 24 and the peripheral wall 22, and a plurality of ribs 33 are provided between the annular wall 34 and the peripheral wall 32. These ribs 23 and 33 connect the annular walls 24 and 34 with the peripheral walls 22 and 32, respectively, and are intended to strengthen the annular walls 24 and 34 and the peripheral walls 22 and 32.

The reel 50 is structured by a cylinder-shaped reel hub 56 and the upper flange 52 and the lower flange 54, which are provided at both end portions of the reel hub 56. A magnetic tape 12, which is an information recording/replaying medium, is wound around the reel hub 56. Lateral direction end portions of the magnetic tape 12 are retained by the upper flange 52 and the lower flange 54.

A bottom wall 58 is provided at a lower flange 54 side of the reel hub 56. A hole portion (not shown) is formed at the center of the bottom wall 58. At a lower surface side of the bottom wall 58, an annular reel gear 60 (driven gear) is formed protruding from the bottom wall 58.

The reel gear 60 can be exposed through a circular opening 38 formed at the center of the lower case 30. A drive device 100 is provided with an unillustrated bucket. The reel gear 60 is positioned when accommodated in the bucket.

Thus, when the magnetic tape cartridge 10 is disposed at a predetermined position, a driving gear provided at an unillustrated driving apparatus disposed at the drive device 100 (see FIG. 3) meshes with the reel gear 60 shown in FIG. 2 and rotary force can be transmitted to the reel 50.

Further, an annular groove 64 is provided at an outer side of the reel gear 60. A rib 36 is provided standing at a circumferential portion of the opening 38 which is provided in the lower case 30. The rib 36 is inserted into the annular groove 64, and the reel 50 is positioned relative to the lower case 30.

As shown in FIGS. 1 and 2, an annular reel gear 70 is formed at an upper surface side of the bottom wall 58 of the reel hub 56. A braking gear 82 is provided at a lower surface outer peripheral portion of a substantially circular braking member 80, which is accommodatable inside the reel hub 56. The reel gear 70 is meshable with the braking gear 82.

Ribs 84 which are substantially U-shaped in plan view (below, referred to as "U-shaped ribs") are provided standing at an upper surface of the braking member 80, with opening sides thereof opposing one another. Correspondingly, a pair of locking pins 66 are pendant at the center of an inner surface of the upper case 20, and are engageable with the U-shaped ribs 84.

Consequently, the braking member 80 is moveable in the reel hub 56 such that the U-shaped ribs 84 (of the braking member 80) move along the locking pins 66, and rotation of the braking member 80 is prevented. Accordingly, when the magnetic tape cartridge 10 is not in use, the braking gear 82 of the braking member 80 meshes with the reel gear 70, and rotation of the reel 50 is prevented.

An annular groove 86 is provided at an outer side of the U-shaped ribs 84 of the braking member 80. An annular projection 68 is provided protruding at an outer side of the locking pins 66 of the upper case 20. A spring 16 is mounted between the braking member 80 and the upper case 20, and is retained by the annular projection 68 and the annular groove 86.

Consequently, the braking member 80 is urged toward the reel gear 70 side. The braking gear 82 and the reel gear 70 can be securely meshed, and undesired rotation of the reel 50 can be assuredly prevented.

A substantially circular pillar-shaped protrusion 88 is provided projecting from the center of the lower surface of the braking member 80. The protrusion 88 is insertable at the hole portion formed in the bottom wall 58. Via the protrusion 88, the braking member 80 can be pushed up in a direction opposing the urging force of the spring 16 by an unillustrated meshing release pin at the drive device 100 side (see FIG. 3). Thus, meshing of the braking gear 82 with the reel gear 60 is released, and the reel 50 becomes rotatable.

An angled surface is provided at a front-right corner portion of the peripheral wall 22 of the upper case 20 and the peripheral wall 32 of the lower case 30. Opening portions 18 and 19 are respectively formed in the angled surface. The opening portions 18 and 19 are provided for drawing-out of the magnetic tape 12 wound around the reel 50 to the outside.

Here, a distal end portion of the magnetic tape 12 is wound about a pin 39. The pin 39 engages with a recess portion 40A which is formed at a leader block 40. Thus, the magnetic tape 12 is integrated with the leader block 40. An engaging portion 40B of the leader block 40 is engaged by an unillustrated pull-out pin provided at the drive device 100 side, and the magnetic tape 12 is wound up by a take-up reel (not shown) which is provided at the drive device 100. At this time, the reel 50 and the take-up reel are driven to rotate simultaneously. While the magnetic tape 12 is being progressively taken up by the take-up reel, information is recorded and/or replayed.

When the magnetic tape cartridge 10 is not in use, the leader block 40 is engaged with the periphery of the opening portions 18 and 19 and does not protrude from the angled surface 102. Thus, the opening portions 18 and 19 are closed by the leader block 40.

Figure 3:
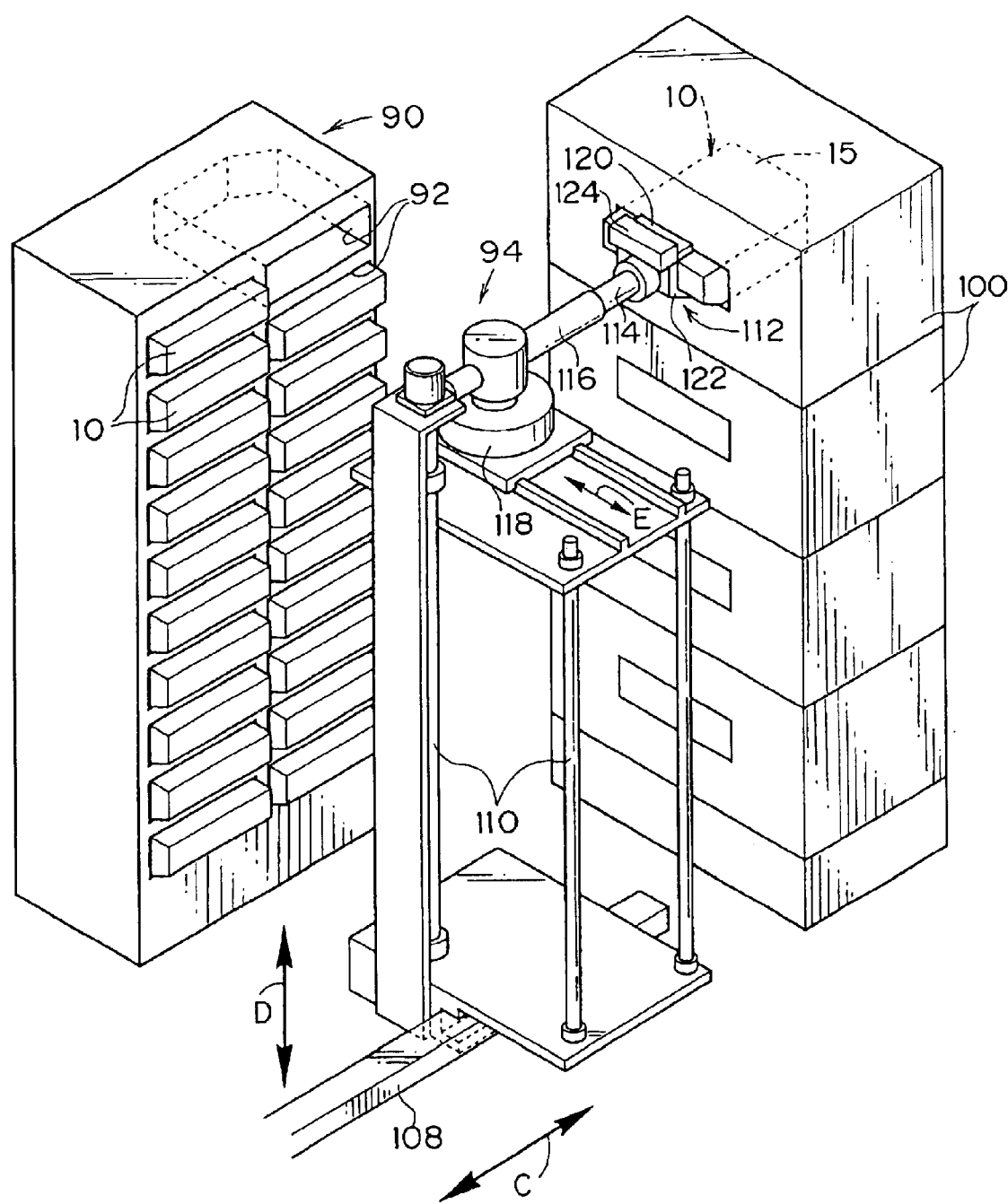
FIG. 3 is a perspective view of a robot hand which moves the magnetic tape cartridge relating to the embodiment of the present invention between a library and a drive device.

Usually, as shown in FIG. 3, a large number of the magnetic tape cartridges 10 is stored in a store known as a library 90, which is equipped with a plurality of holders 92 in which the magnetic tape cartridges 10 can be stored. A desired one of the magnetic tape cartridges 10 is taken out by a robot hand 94, and loaded into one of a plurality of the drive devices 100. In a state in which the magnetic tape cartridge 10 is positioned in the drive device 100, the magnetic tape 12 (see FIG. 1) is drawn out from the case 15. The magnetic tape 12 is guided along a predetermined tape path, and is brought close to a recording/replaying head (not shown) of the drive device 100. Information is recorded onto the magnetic tape 12 and/or information that has been recorded on the magnetic tape 12 is replayed.

Figure 4:
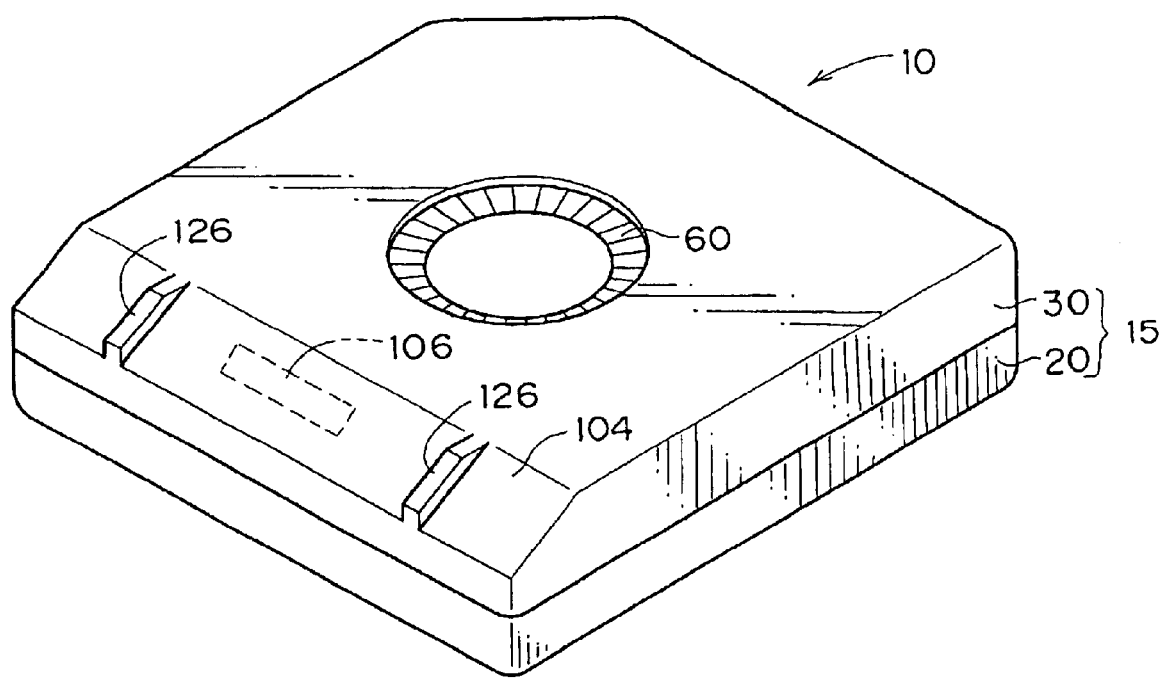
FIG. 4 is a perspective view of a lower case of the magnetic tape cartridge relating to the embodiment of the present invention, as seen with the lower case facing upward.

As shown in FIG. 4, an angled surface portion 104 which is angled at 30° is formed in the lower case 30, at a rear end side of the peripheral wall 32 with respect to the loading direction of the magnetic tape cartridge 10. A generation identification portion 106 is attached at an inner side of the angled surface portion 104.

When the magnetic tape cartridge 10 is loaded into the drive device 100 (see FIG. 3), the generation identification portion 106 is detected by an unillustrated proximity sensor, contact terminal or the like which is provided at the drive device 100. A generation (type) of the magnetic tape cartridge 10 that has been loaded, i.e., a class of the magnetic tape cartridge 10 based on principal capabilities and/or specifications, such as, recording capacity, recording format, and the like, or a product series relating to such a class, is distinguished according to the generation identification portion 106. Accordingly, it can be judged whether or not information therein can be recorded and/or replayed at the drive device 100.

Specifically, in a case in which a magnetic tape cartridge 10 with a high recording capacity (a higher generation recording tape cartridge) is loaded in a drive device 100 with a low recording/replaying ability (a lower generation drive device), information cannot be recorded on and/or replayed from this magnetic tape cartridge 10 by this drive device 100. Accordingly, in such a case, the impossibility of recording/replaying is judged and the magnetic tape cartridge 10 is promptly ejected from the drive device 100.

Now, a robot hand that moves the magnetic tape cartridge will be explained.

Figure 5:
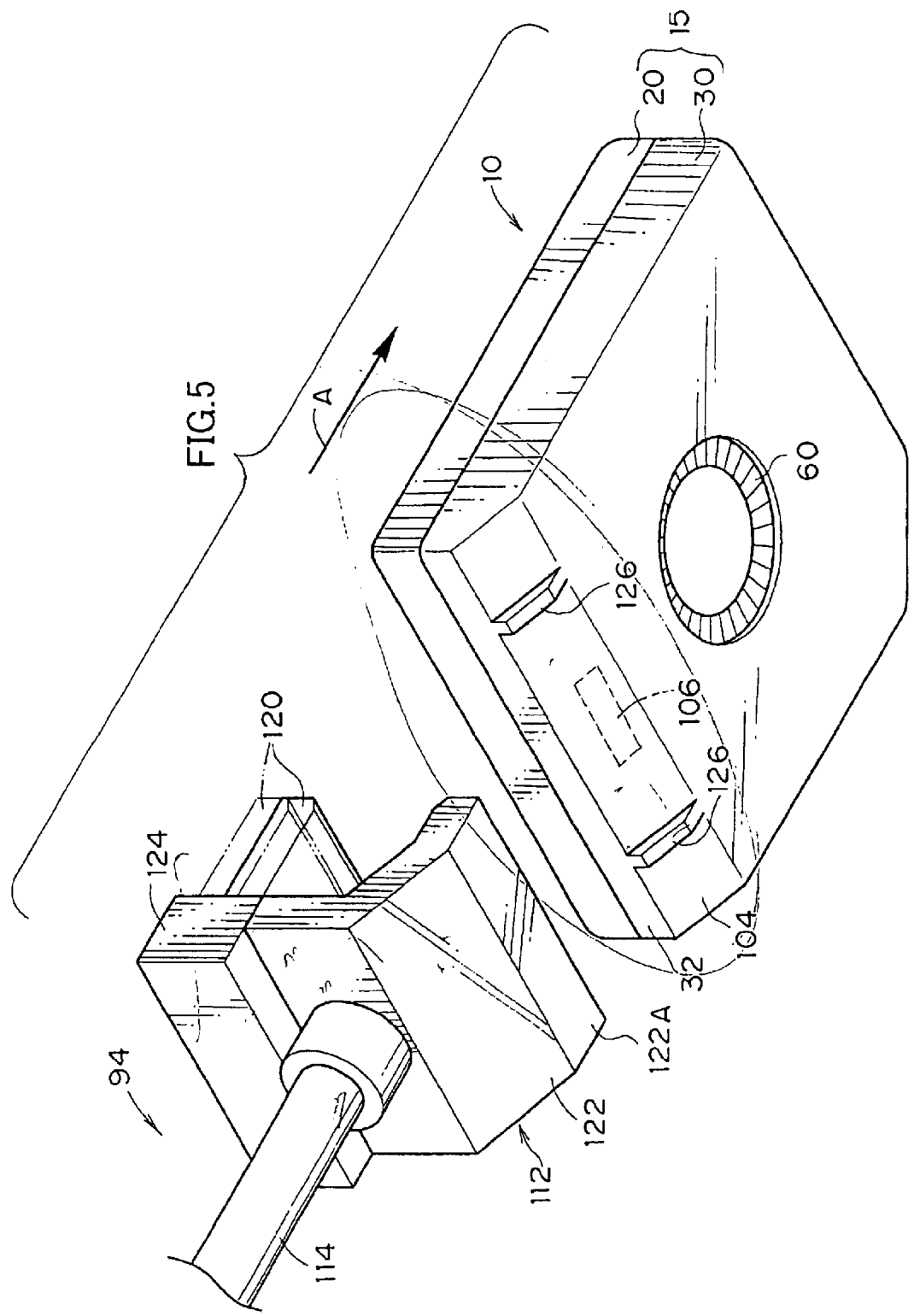
FIG. 5 is a perspective view as seen from below the robot hand and the magnetic tape cartridge relating to the embodiment of the present invention.

As shown in FIGS. 3 and 5, a depth of the holder 92 of the library 90 is set to be shorter than a length in a front-back direction of the magnetic tape cartridge 10. In a state in which the magnetic tape cartridge 10 is accommodated in the holder 92, an end portion (a rear end in the loading direction of the magnetic tape cartridge 10 (the direction of arrow A)) of the magnetic tape cartridge 10 is exposed from the holder 92. The robot hand 94 grips this exposed portion, and moves the magnetic tape cartridge 10.

The robot hand 94 is moveable along rails 108 and 110, in the directions of an arrow C and an arrow D. The robot hand 94 moves according to a position of the desired magnetic tape cartridge 10. Further, the robot hand 94 is equipped with a gripping body 112 which grips the magnetic tape cartridge 10. A rod 114 is moved into and out from a cylinder 116 by air pressure. Accordingly, the gripping body 112 can be moved toward and away from the holder 92 and the drive device 100.

The robot hand 94 is equipped with a turntable 118. The robot hand 94 is moveable in the direction of an arrow E and, when the robot hand 94 is to move the magnetic tape cartridge 10 from the holder 92 of the library 90 to the drive device 100 or from the drive device 100 to the holder 92, the turntable 118 can rotate to carry out the movement quickly.

The gripping body 112 is structured with an upper hand portion 120 and a lower hand portion 122. The upper hand portion 120 and lower hand portion 122 are disposed vertically with respect to each other, and grip the case 15 of the magnetic tape cartridge 10 from above and below. Thus, in a state in which the case 15 is gripped by the gripping body 112, the case 15 is positioned with respect to the holder 92 or the drive device 100, with a central portion in the lateral direction of the upper hand portion 120 and the lower hand portion 122 serving as a reference portion.

Figure 6:
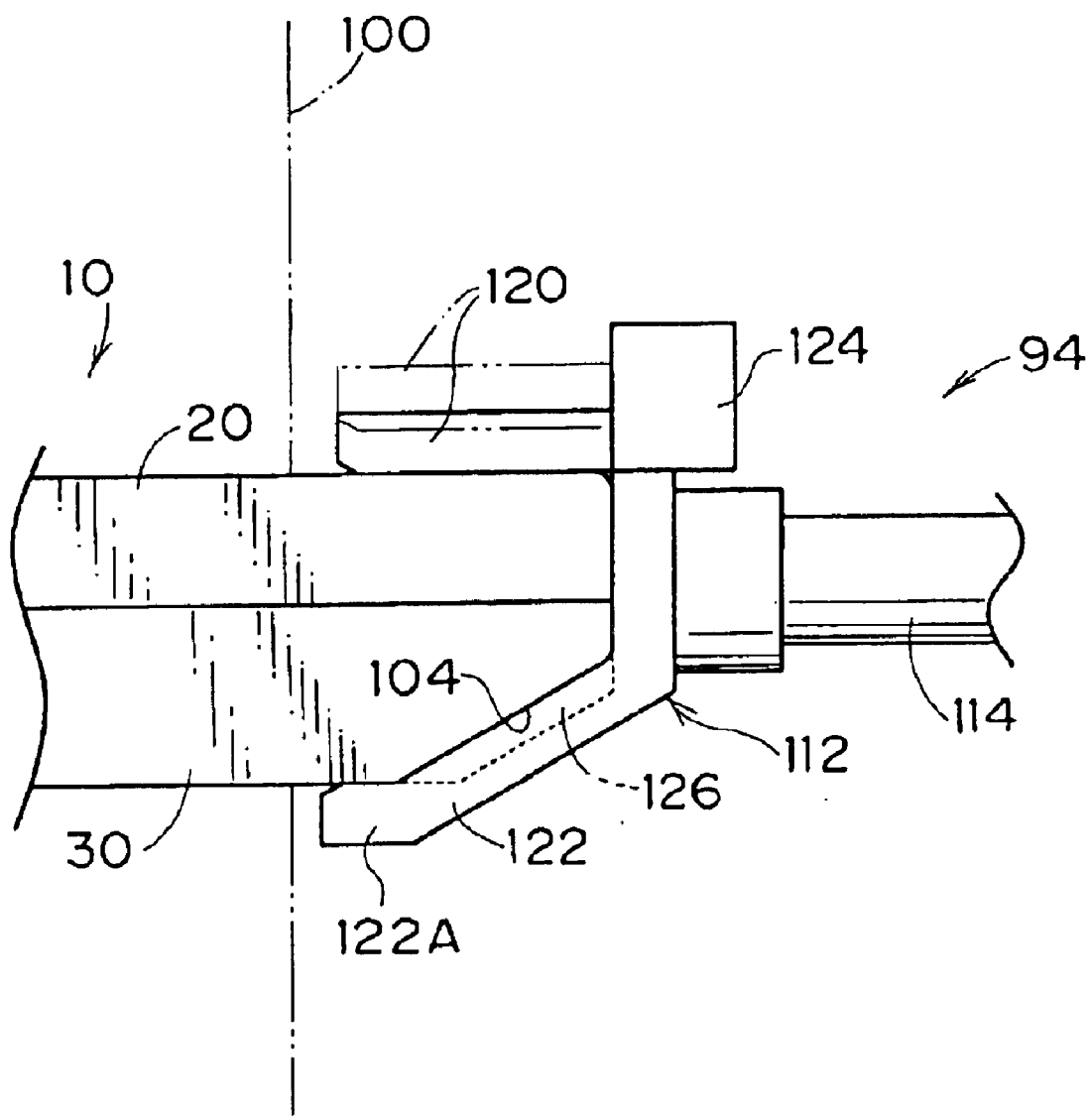
FIG. 6 is a side view showing a state in which the robot hand is gripping the magnetic tape cartridge relating to the embodiment of the present invention.
Figure 7:
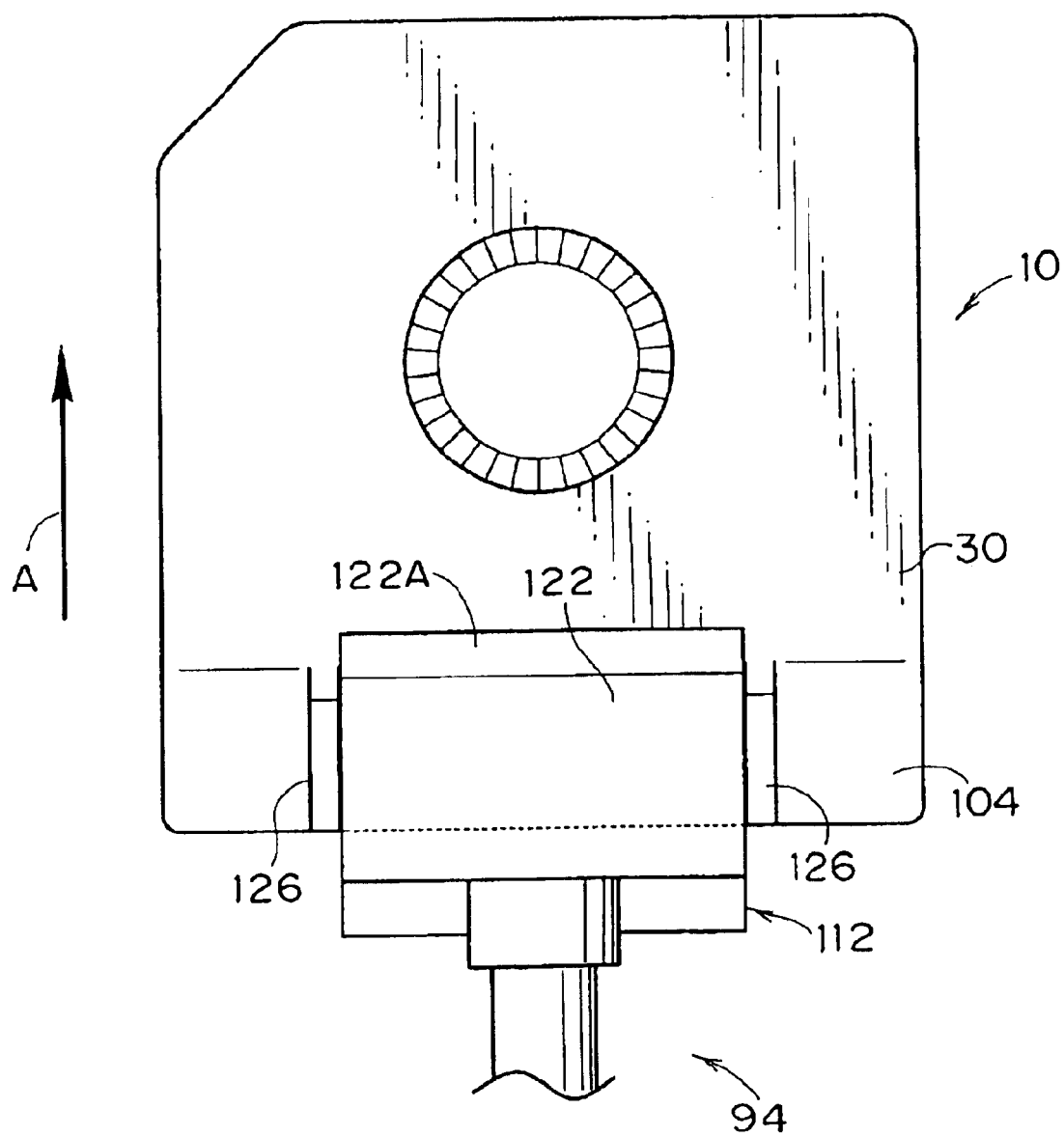
FIG. 7 is a bottom view showing a state in which the robot hand is gripping the magnetic tape cartridge relating to the embodiment of the present invention.

As shown in FIGS. 5 and 6, the lower hand portion 122 is slanted at a downward inclination of 30° and is surface-contactable with the angled surface portion 104 formed at the lower case 30. At a distal end portion of the lower hand portion 122, a surface-contact portion 122A is formed horizontally, and is surface-contactable with an underside surface of the lower case 30. Meanwhile, the upper hand portion 120 is disposed horizontally, and is surface-contactable with an upper surface of the upper case 20 when gripping the magnetic tape cartridge 10.

A drive device 124 is provided at the gripping body 112. The upper hand portion 120 can be moved vertically by an unillustrated stepper motor which is provided at this drive device 124.

In accordance with the structure described above, the robot hand 94 is positioned in correspondence to the position of the desired magnetic tape cartridge 10, the rod 114 is extended, and the gripping body 112 is brought close to the magnetic tape cartridge 10.

At this time, the upper hand portion 120 of the gripping body 112 is positioned upward, and a gap is provided between the upper hand portion 120 and the upper surface of the upper case 20. Accordingly, only the lower hand portion 122 is surface-contacted, with the angled surface portion 104 of the lower case 30 and the underside surface of the lower case 30. The area of this contact surface steadily increases with extension of the rod 114.

Then, when the rod 114 stops, the stepper motor disposed at the gripping body 112 drives, and the upper hand portion 120 is moved downward. Consequently, the upper hand portion 120 surface-contacts with the upper case 20 and grips the magnetic tape cartridge 10 together with the lower hand portion 122. The magnetic tape cartridge 10 is then moved according to the positions of the holder 92 and the drive device 100.

Now, relevant details of the magnetic tape cartridge relating to the embodiment of the present invention will be explained.

As shown in FIGS. 4 to 7, a pair of ribs 126 is formed at the angled surface portion 104 of the lower case 30 of the magnetic tape cartridge 10. The ribs 126 are formed at the outer side of the lower case 30, along the loading direction of the magnetic tape cartridge 10 (the direction of arrow A).

A separation distance between the ribs 126 is set to be substantially the same as a width (a width dimension) of the lower hand portion 122 structuring the gripping body 112 of the robot hand 94 (that is, a difference between the separation distance between the ribs 126 and the width of the lower hand portion 122 is set to less than 1 mm). Thus, the lower hand portion 122 can be disposed between one and the other of the ribs 126.

Consequently, because the ribs 126 are provided at the angled surface portion 104 of the lower case 30 at substantially the same width as the lower hand portion 122 of the robot hand 94, the ribs 126 are guided by the lower hand portion 122, due to width end portions of the lower hand portion 122 abutting against the ribs 126. Thus, even in a state in which the magnetic tape cartridge 10 is displaced in the lateral direction of the holder 92 or the drive device 100 because of a gap provided between the magnetic tape cartridge 10 and the holder 92 or between the magnetic tape cartridge 10 and the drive device 100, positioning of the magnetic tape cartridge 10 in the lateral direction relative to the lower hand portion 122 is achieved via the ribs 126.

Hence, the magnetic tape cartridge 10 can be positioned relative to the robot hand 94 via the lower hand portion 122, and the magnetic tape cartridge 10 can be positioned relative to the holder 92 or the drive device 100 via the robot hand 94.

Therefore, even if the magnetic tape cartridge 10 is being moved quickly by the robot hand 94 between the drive device 100 and the holder 92 of the library 90, the magnetic tape cartridge 10 will not be knocked against the holder 92 or the drive device 100.

A separation distance between the ribs 126 at a distal end side thereof is set to be wider than at a base portion side thereof. When the lower hand portion 122 grips the magnetic tape cartridge 10, the lower hand portion 122 moves from the distal end side of the ribs 126 toward the base portion side, and surface-contacts with the angled surface portion 104.

Consequently, because the separation distance between the ribs 126 at the distal end side is set to be wider than at the base portion side, the lower hand portion 122 easily guides the ribs 126 in correspondence with movement of the lower hand portion 122. Moreover, inner sides of the ribs 126, which face each other, have curvatures at edge portions thereof. Accordingly, the lower hand portion 122 easily guides the ribs 126 when the width end surfaces of the lower hand portion 122 abut against the ribs 126.

Although the pair of ribs 126 is provided at the angled surface portion 104 of the lower case 30 in this case, the present invention is not limited to this. It is sufficient if the magnetic tape cartridge 10 can be positioned relative to the lower hand portion 122 of the robot hand 94 in the state in which the robot hand 94 is gripping the magnetic tape cartridge 10.

Figure 8:
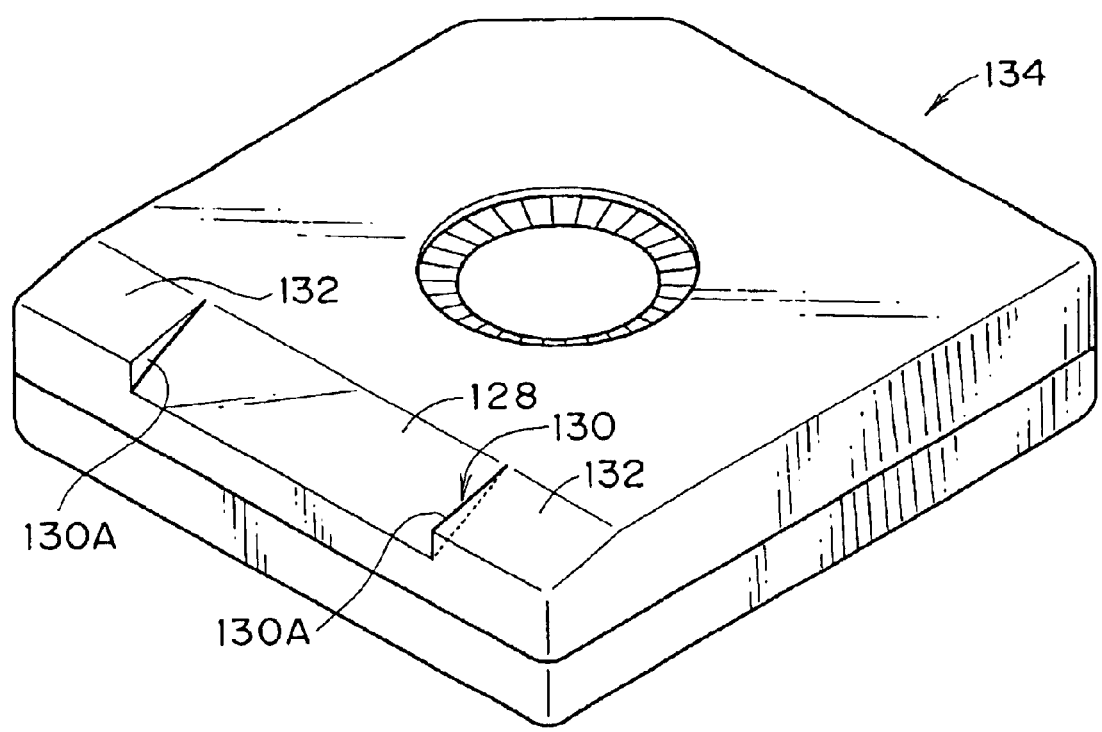
FIG. 8 is a perspective view of a variant example of the magnetic tape cartridge relating to the embodiment of the present invention, as seen in a state in which the lower case faces upward.

For example, as shown in FIG. 8, an angled surface portion 128 may be provided at a recessed portion 130, and projected portions 132 may be provided at both sides of the angled surface portion 128. Consequently, when the lower hand portion 122 (see FIG. 5) is brought close thereto, the width end portions of the lower hand portion 122 abut against side walls 130A of the recessed portion 130, the lower hand portion 122 guides the side walls 130A, and positioning of the magnetic tape cartridge 10 in the lateral direction relative to the lower hand portion 122 is achieved.

A separation distance between the side walls 130A at a distal end side thereof is set to be wider than at a base portion side thereof. When the lower hand portion 122 (see FIG. 5) grips a magnetic tape cartridge 134, the lower hand portion 122 easily guides the recessed portion 130. Moreover, edge portions of the recessed portion 130 have curvatures. Accordingly, the lower hand portion 122 easily guides the side walls 130A of the recessed portion 130 when the width end surfaces of the lower hand portion 122 abut against the side walls 130A of the recessed portion 130.

As shown in FIG. 1, the recording tape cartridge is equipped with the leader block 40, and the leader block 40 is utilized when the magnetic tape 12 is to be drawn out of the case 15. However, the present invention is not limited thus. Obviously, a recording tape cartridge which is provided with some other control member instead of the leader block 40 may be used. Hence, the structure could be provided with, for example, a leader pin, a leader tape or the like.

Figure 9:
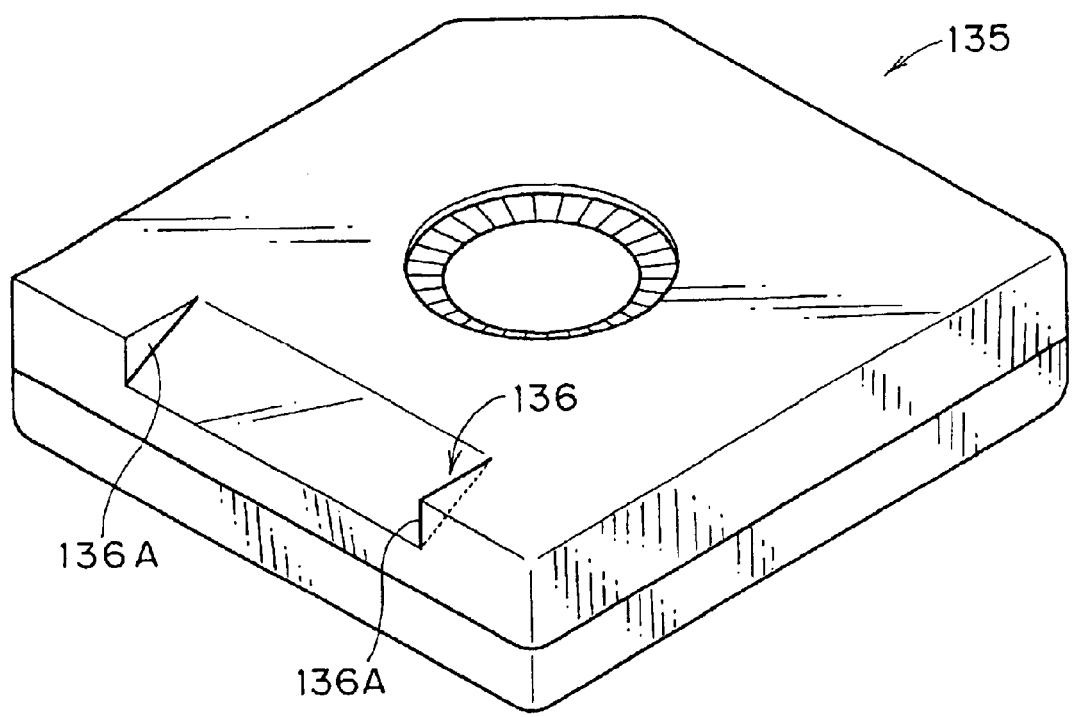
FIG. 9 is a perspective view of another variant example of the magnetic tape cartridge relating to the embodiment of the present invention, as seen in a state in which the lower case faces upward.
Figure 10:
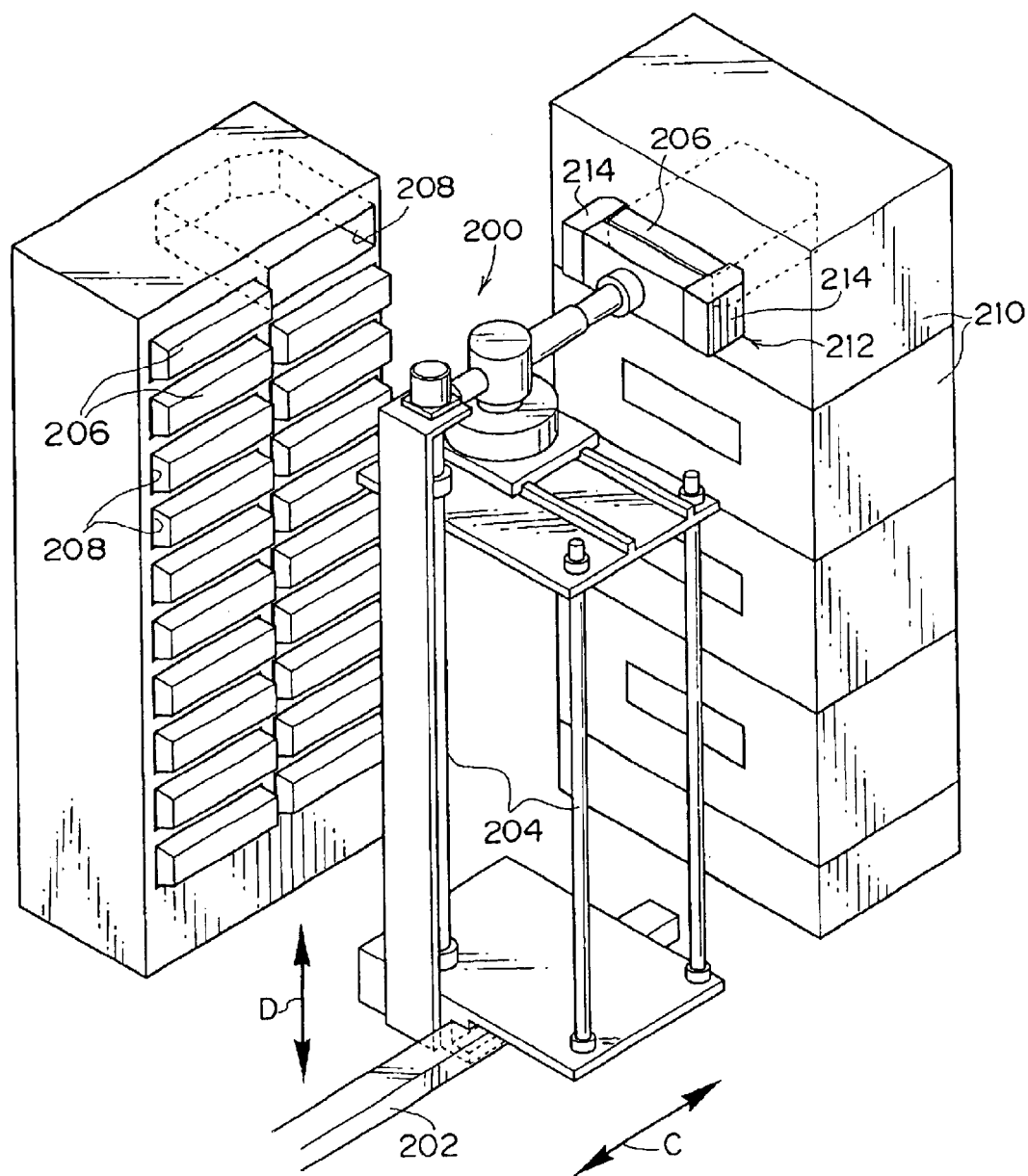
FIG. 10 is a perspective view showing a robot hand which grips a magnetic tape cartridge in a lateral direction.
Figure 11:
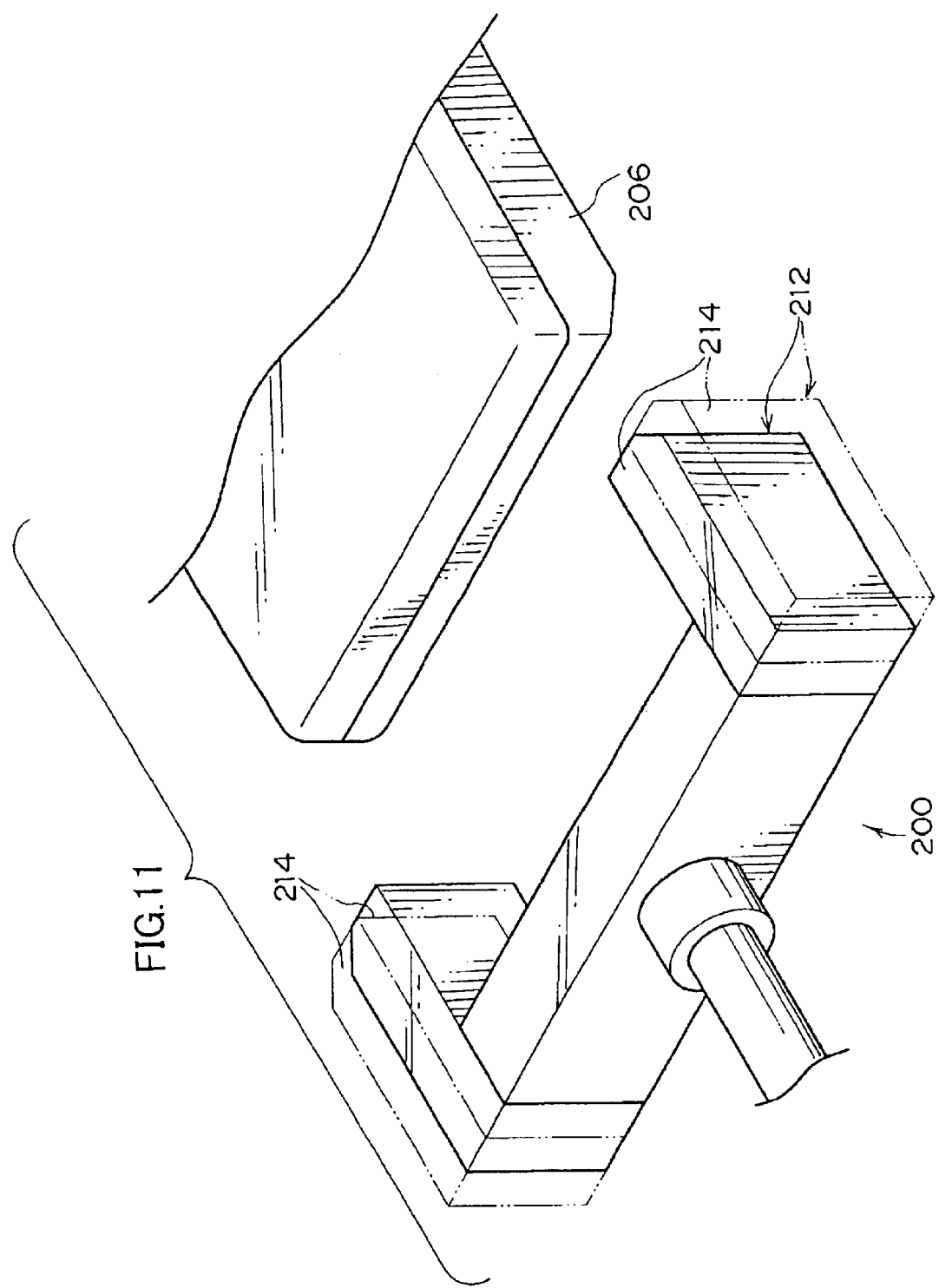
FIG. 11 is a perspective view as seen from above the robot hand which grips the magnetic tape cartridge in the lateral direction.

Further, depending on the type of the magnetic tape cartridge, the shape of the lower case may be different from that in the present embodiment, and there may be cases in which the angled surface portion is not formed. In such a case, as shown in FIG. 9, an inclined recess portion 136 may be formed at a portion of a magnetic tape cartridge 135 that abuts against the lower hand portion 122 (see FIG. 5). The width end portions of the lower hand portion 122 are abutted against side walls 136A of this inclined recess portion 136, and thus positioning of the magnetic tape cartridge 135 in the lateral direction relative to the lower hand portion 122 may be performed via the inclined recess portion 136.

Edge portions (rim portions) of the inclined recess portion 136 may have curvatures. Thus, when the width end surfaces of the lower hand portion 122 abut against the side walls 136A of the inclined recess portion 136, the lower hand portion 122 can easily guide the side walls 136A of the inclined recess portion 136.

Furthermore, in the present embodiment, as shown in FIG. 1, an example of application of the present invention to the magnetic tape cartridge 10 which rotatably accommodates the single reel 50 in the case 15 has been illustrated, but the present invention is not limited thus. For example, the present invention may be applied to a magnetic tape cartridge provided with two reels, for video applications or the like.

Yet further, this structure uses the magnetic tape 12 as the recording tape, but the present invention is not limited to this. The recording tape of the present invention includes any long tape-like information recording/replaying medium which is capable of recording information and/or replaying information that has been recorded. Of course, the recording tape cartridge relating to the present invention is applicable to any recording/replaying-type recording tape.

Because the present invention has the structure described above, even in a state in which a recording tape cartridge is shifted in a lateral direction of a holder or drive device due to a gap provided between the recording tape cartridge and the holder or between the recording tape cartridge and the drive device, the recording tape cartridge can be positioned in the lateral direction via a robot hand. Thus, the recording tape cartridge can be positioned with respect to the lateral directions of the holder and the drive device.

What is claimed is:

1. A recording tape cartridge which can be gripped from predetermined directions using a gripping tool and loaded at a drive device for at least one of recording and replaying information, the recording tape cartridge comprising:

recording tape; and a case in which the recording tape is accommodated, the case comprising outer surfaces at an upper side and a lower side, which upper and lower outer surfaces are grippable by a gripping tool, and the case further comprising a wall surface at a loading direction rear end vicinity thereof, wherein the wall surface abuts against a side end surface of the gripping tool during loading and the case is positioned in a lateral direction which substantially intersects the loading direction.

2. The recording tape cartridge of claim 1, wherein the side end surface of the gripping tool has a surface substantially facing in the lateral direction.

3. The recording tape cartridge of claim 1, wherein, during a gripping operation of the gripping tool, the wall surface follows and is guided along a side end surface of the gripping tool, and is positioned in the lateral direction.

4. The recording tape cartridge of claim 1, wherein the wall surface comprises two opposing surfaces, and the gripping tool grips the case so as to be positioned between the two opposing surfaces.

5. The recording tape cartridge of claim 1, wherein the gripping tool is attached to a robot arm.

6. The recording tape cartridge of claim 1, wherein the case further comprises a rib protruding from a surface of the case at an outer surface loading direction rear end vicinity, and the rib defines the wall surface.

7. The recording tape cartridge of claim 6, wherein the case further comprises a surface at the outer surface rear end side, the surface being depressed relative to other portions of the outer surface, and the rib is formed at the relatively depressed surface.

8. The recording tape cartridge of claim 7, wherein the relatively depressed surface comprises, at the rear end side of the case, a surface which is angled toward a direction opposite to the loading direction, and the rib is formed at the angled surface.

9. The recording tape cartridge of claim 1, wherein the case further comprises two ribs protruding from at least one surface of the upper and lower outer surfaces at rear end vicinities of the at least one surface, the ribs being separated by a predetermined spacing and the ribs defining the wall surface.

10. The recording tape cartridge of claim 9, wherein a difference between the predetermined spacing of the ribs and a width between two side end surfaces of the gripping tool is not more than 1 mm.

11. The recording tape cartridge of claim 6, wherein the rib comprises a rim portion at which a curvature is formed.

12. The recording tape cartridge of claim 9, wherein the ribs each comprise a rim portion and a base portion, and a separation between rim portions of the ribs is greater than a separation between base portions of the ribs.

13. The recording tape cartridge of claim 1, wherein the case further comprises: a surface at a rear end side of at least one of the upper and lower outer surfaces, the surface being depressed relative to other portions of the at least one outer surface; and protruding portions at lateral direction end portions of the relatively depressed surface, the protruding portions defining the wall surface.

14. The recording tape cartridge of claim 13, wherein the relatively depressed surface comprises, at the rear end side of the case, a surface which is angled toward a direction opposite to the loading direction, and the protruding portions are formed at the angled surface.

15. The recording tape cartridge of claim 1, wherein the case further comprises two protruding portions protruding from outer surface rear end vicinities, the protruding portions being separated by a predetermined spacing and the protruding portions defining the wall surface.

16. The recording tape cartridge of claim 15, wherein a difference between the predetermined spacing of the protruding portions and a width between two side end surfaces of the gripping tool is not more than 1 mm.

17. The recording tape cartridge of claim 13, wherein the protruding portions comprise rim portions at which curvatures are formed.

18. The recording tape cartridge of claim 15, wherein the protruding positions each comprise a rim portion and a base portion, and a separation between rim portions of the protruding portions is greater than a separation between base portions of the protruding portions.

19. The recording tape cartridge of claim 8, wherein the recording tape cartridge comprises an identification member for distinguishing at least one of recording capacity and recording format of the recording tape cartridge, the identifying member is disposed at an inside surface of the angled surface, and at least one of recording capacity and recording format of the recording tape cartridge can be identified from outside.

20. The recording tape cartridge of claim 14, wherein the recording tape cartridge comprises an identification member for distinguishing at least one of recording capacity and recording format of the recording tape cartridge, the identifying member is disposed at an inside surface of the angled surface, and at least one of recording capacity and recording format of the recording tape cartridge can be identified from outside.

21. A recording tape cartridge, which accommodates a recording tape, and which can be gripped by a robot hand and loaded at a drive device for at least one of recording and replaying information on the recording tape, the recording tape cartridge comprising:

the recording tape; and a case in which the recording tape is accommodated, the case comprising upper and lower outer surfaces, the upper and lower surfaces of the case being graspable by a gripping tool of a robot hand from behind in a direction of loading at the drive device, wherein the case further comprises a wall surface at a loading direction rear end vicinity, the wall surface abutting against a lateral direction end surface of the gripping tool of the robot hand during loading, for positioning the case in the lateral direction.

* * * * *